US 6,536,551 B1

(12) United States Patent
Tanaka et al.

(10) Patent No.: US 6,536,551 B1
(45) Date of Patent: Mar. 25, 2003

(54) HYDROGEN USING SYSTEM FOR INSTALLATION IN VEHICLE AND CONTROL METHOD FOR THE SYSTEM

(75) Inventors: Tomohiro Tanaka, Toyota (JP); Ichiro Hosotani, Aichi-ken (JP); Syuji Hirakata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/680,945

(22) Filed: Oct. 10, 2000

(30) Foreign Application Priority Data

Oct. 20, 1999 (JP) .......................................... 11-298733

(51) Int. Cl.[7] ............................................. B60K 21/00
(52) U.S. Cl. ........................... 180/271; 429/12; 429/17; 180/65.8
(58) Field of Search ................. 180/65.1, 65.3, 180/65.8, 271; 429/10, 17, 19, 20

(56) References Cited

U.S. PATENT DOCUMENTS

| | | | | |
|---|---|---|---|---|
| 3,840,036 A | * | 10/1974 | Renk | 137/38 |
| 3,994,357 A | * | 11/1976 | Smitley | 137/39 |
| 3,994,359 A | * | 11/1976 | Smitley | 137/38 |
| 4,960,145 A | * | 10/1990 | Schlotzhauer | 137/38 |
| 4,961,151 A | * | 10/1990 | Early et al. | 180/65.8 |
| 5,409,676 A | * | 4/1995 | Nasako et al. | 165/101 |
| 5,596,261 A | * | 1/1997 | Suyama | 320/109 |
| 5,605,770 A | * | 2/1997 | Andreoli et al. | 429/20 |
| 5,648,182 A | * | 7/1997 | Hara et al. | 429/20 |
| 5,851,108 A | * | 12/1998 | Clymer et al. | 222/40 |
| 6,106,963 A | * | 8/2000 | Nitta et al. | 429/10 |
| 6,158,537 A | * | 12/2000 | Nonobe | 180/65.1 |
| 6,165,633 A | * | 12/2000 | Negishi | 423/651 |
| 6,213,234 B1 | * | 4/2001 | Rosen et al. | 180/65.3 |
| 6,230,494 B1 | * | 5/2001 | Botti et al. | 60/649 |
| 6,274,093 B1 | * | 8/2001 | Long et al. | 422/113 |
| 6,294,276 B1 | * | 9/2001 | Ogino | 420/900 |
| 6,329,091 B1 | * | 12/2001 | James | 429/17 |

FOREIGN PATENT DOCUMENTS

JP 4163860 * 9/1992 ............... 180/65.1

* cited by examiner

Primary Examiner—Paul N. Dickson
Assistant Examiner—Toan C To
(74) Attorney, Agent, or Firm—Oblon, Spivak, McClelland, Maier & Neustadt, P.C.

(57) ABSTRACT

A hydrogen using system for installation in a vehicle has a methanol tank that stores methanol as a source material of hydrogen, which is a fuel of the hydrogen using system, a water tank that stores water, a methanol reformer that produces a hydrogen fuel from methanol and water, a first electromagnetic valve provided in a first channel connecting the methanol tank to the reformer, a polymer electrolyte fuel cell stack that generates power from the hydrogen fuel supplied from the reformer, a second electromagnetic valve provided in a second channel connecting the reformer to the fuel cell stack, an electronic control unit that controls various portions of the hydrogen using system, etc. When an impact occurs on the vehicle, the electronic control unit shuts the first channel and the second channel by forcibly closing the first and second electromagnetic valves based on a detection signal from the impact sensor. This hydrogen using system curbs reactions of hydrogen at the time of an accident or the like, thereby further improving safety of the system.

26 Claims, 6 Drawing Sheets

HYDROGEN USING SYSTEM FOR INSTALLATION IN VEHICLE AND CONTROL METHOD FOR THE SYSTEM

The disclosure of Japanese Patent Application No. HEI 11-298733 filed on Oct. 20, 1999 including the specification, drawings and abstract is incorporated herein by reference in its entirety.

BACKGROUND OF THE INVENTION

1. Field of the Invention

The present invention relates to a hydrogen using system installed in a passenger car or the like.

2. Description of the Related Art

Various low emission vehicles have recently been developed in response to environmental needs. Among the low emission vehicles are electric vehicles using fuel cells as a power source. As well known, hydrogen is normally used as a fuel for fuel cells installed in electric vehicles. A fuel cell is therefore an example of a hydrogen using system, although other systems which use hydrogen and which may be installed in a vehicle, for example a hydrogen combustor, and others, could be envisaged and are incorporated into the definition of a hydrogen using system, as this term is used herein. However, since hydrogen can react with air at predetermined concentrations, for example by combustion or an explosion, it is essential for a vehicle incorporating a hydrogen using system to have provisions for protecting against such a reaction, or for minimizing its effect, in the case where the vehicle is involved in a collision.

An example of a conventional provision is the hydrogen using system for installation in a vehicle described in Japanese Patent Application Laid-Open No. HEI 5-77648. In this hydrogen using system, impact absorbing beams are provided around a fuel cell generator apparatus so as to prevent impact forces occurring et the time of a vehicle crash or the like from reaching the fuel cell generator apparatus. Furthermore, a protective barrier is provided around the hydrogen using system so that if the aforementioned reaction should be induced by a breakage of the fuel cell generator apparatus or the like, the effect of the reaction will be prevented from reaching the occupants.

However, in the aforementioned conventional hydrogen using system for installation in a vehicle, in which the fuel cell generator apparatus is provided with a protective barrier and the vehicle structure is strengthened, the reaction of the hydrogen itself cannot be controlled or stopped although the risk to occupants can be reduced. Therefore, there still is a possibility that the reaction of hydrogen will occur at the time of a vehicle crash or the like.

SUMMARY OF THE INVENTION

Accordingly, it is an object of the invention to provide a hydrogen using system for installation in a vehicle that improves its safety by curbing reactions of hydrogen in case of an accident.

To achieve the aforementioned and other objects, a hydrogen using system for installation in a vehicle in accordance with a first aspect of the invention includes a fuel cell portion that provides an electromotive force using hydrogen as a fuel, a conveyance passage that conveys the hydrogen and a source material for producing the hydrogen, and a shutter that shuts the conveyance passage in accordance with an impact on the vehicle.

Due to the above-described construction of the hydrogen using system for installation in a vehicle, when an impact occurs on the vehicle, for example, at the time of a crash or the like, the conveyance passage related to conveyance of the hydrogen or the hydrogen-producing source material is shut in accordance with the impact on the vehicle. Therefore, even in case of such an accident, the amount of hydrogen leaking from the hydrogen using system can be minimized. As a result, the aforementioned reactions of hydrogen can be curbed.

Further, the hydrogen using system may include a first passage that conveys the source material for producing the hydrogen, and a second shutter positioned to shut the first passage, the second shutter being operative to shut the first passage in accordance with an impact on the vehicle.

The hydrogen using system for installation in a vehicle may further include an impact sensor that detects the impact on the vehicle, and the shutter may include a valve that opens and closes the conveyance passage and a controller that forcibly closes the valve based on the detection of the impact by the impact sensor.

Therefore, the hydrogen using system is able to surely detect an impact on the vehicle and, based on the detection, surely shut the passage.

The hydrogen using system for installation in a vehicle in accordance with the first aspect of the invention may further include a tank that stores the source material for producing the hydrogen, and a reformer that produces the hydrogen by reforming the source material. In this case, the source material from the tank is supplied to the reformer via a first passage of the conveyance passage. The hydrogen produced through reforming by the reformer is supplied to the fuel cell portion via a second passage of the conveyance passage. A valve may be provided for each of the first passage and the second passage.

Therefore, if an accident occurs in, for example, a hydrogen using system wherein hydrogen fuel is provided by reforming a hydrogen-producing source material such as methanol or the like, leakage of the hydrogen-producing source material and leakage of hydrogen produced by reforming the source material can be reduced.

The hydrogen using system for installation in a vehicle in accordance with the aspect of the invention may further include a first tank that stores the source material for producing the hydrogen, a reformer that produces the hydrogen by reforming the source material, and a second tank that temporarily stores the hydrogen produced through reforming by the reformer. In this case, the source material from the first tank is supplied to the reformer via a first passage of the conveyance passage. The hydrogen produced by reforming in the reformer is supplied to the second tank via a second passage. The hydrogen from the second tank is supplied to the fuel cell portion via a third passage. The valve may be provided for each of the first passage, the second passage, and the third passage.

Therefore, even a hydrogen using system having a second tank is able to curb the leakage of hydrogen from the second tank and secure safety.

The hydrogen using system for installation in a vehicle in accordance with this aspect of the invention may further include a tank that stores the hydrogen. In this case, the hydrogen from the tank is supplied to the fuel cell portion via the passage. A valve may be provided for the conveyance passage between the tank and the fuel cell portion.

Therefore, if an accident occurs in a hydrogen using system having a tank that stores hydrogen, leakage of hydrogen from the hydrogen storage tank can be suitably curbed.

Furthermore, the hydrogen using system for installation in a vehicle may further include a hydrogen storage tank that stores hydrogen, wherein the hydrogen from the hydrogen storage tank is supplied to the fuel cell portion via a first passage, and any hydrogen that is not consumed in the fuel cell portion is recirculated to the first passage via a second passage. A valve may be provided for each of the first passage and the second passage.

Therefore, even a hydrogen using system having a passage (second passage) for recirculating any hydrogen that is not consumed in the fuel cell portion is able to suitably curb leakage of hydrogen from the hydrogen storage tank and from the fuel cell portion by shutting the circulation passage as well.

A hydrogen using system for installation in a vehicle in accordance with another aspect of the invention includes a hydrogen reaction portion that uses hydrogen as a fuel, a passage that conveys the hydrogen and a source material for producing the hydrogen, and a passage shutter that shuts the passage in accordance with an impact on the vehicle.

In a hydrogen using system for installation in a vehicle having a hydrogen reactor that uses hydrogen as a fuel, such as a hydrogen combustor (e.g., a hydrogen engine) or the like, there is a concern about hydrogen leakage or the like if a crash or the like should occurs, as is the case with the above-described system. Due to the system construction in accordance with this aspect of the invention, if an impact occurs on the vehicle, for example, at the time of a crash or the like, the system having the hydrogen reactor shuts the conveyance passage related to the conveyance of hydrogen or a hydrogen-producing source material in accordance with the impact on the vehicle.

Therefore, in case of an accident, the amount of hydrogen leaking from the hydrogen using system can be minimized, so that the aforementioned reactions of hydrogen can be curbed.

In a control method for a hydrogen using system for installation in a vehicle in accordance with still another aspect of the invention, an impact on the vehicle is detected and, in accordance with the impact on the vehicle, a passage that conveys hydrogen or a materiel for producing the hydrogen is shut. Therefore, if an impact occurs on the vehicle, for example, at the time of a crash or the like, the passage related to the conveyance of hydrogen or the hydrogen-producing source material is shut in accordance with the impact on the vehicle. Hence, in case of such an accident, the amount of hydrogen leaking from the hydrogen using system can be minimized. As a result, the aforementioned reactions of hydrogen can be curbed.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

A first preferred embodiment of the hydrogen using system for installation in a vehicle of the invention will be described hereinafter with reference to FIGS. 1 to 3.

Figure 1:
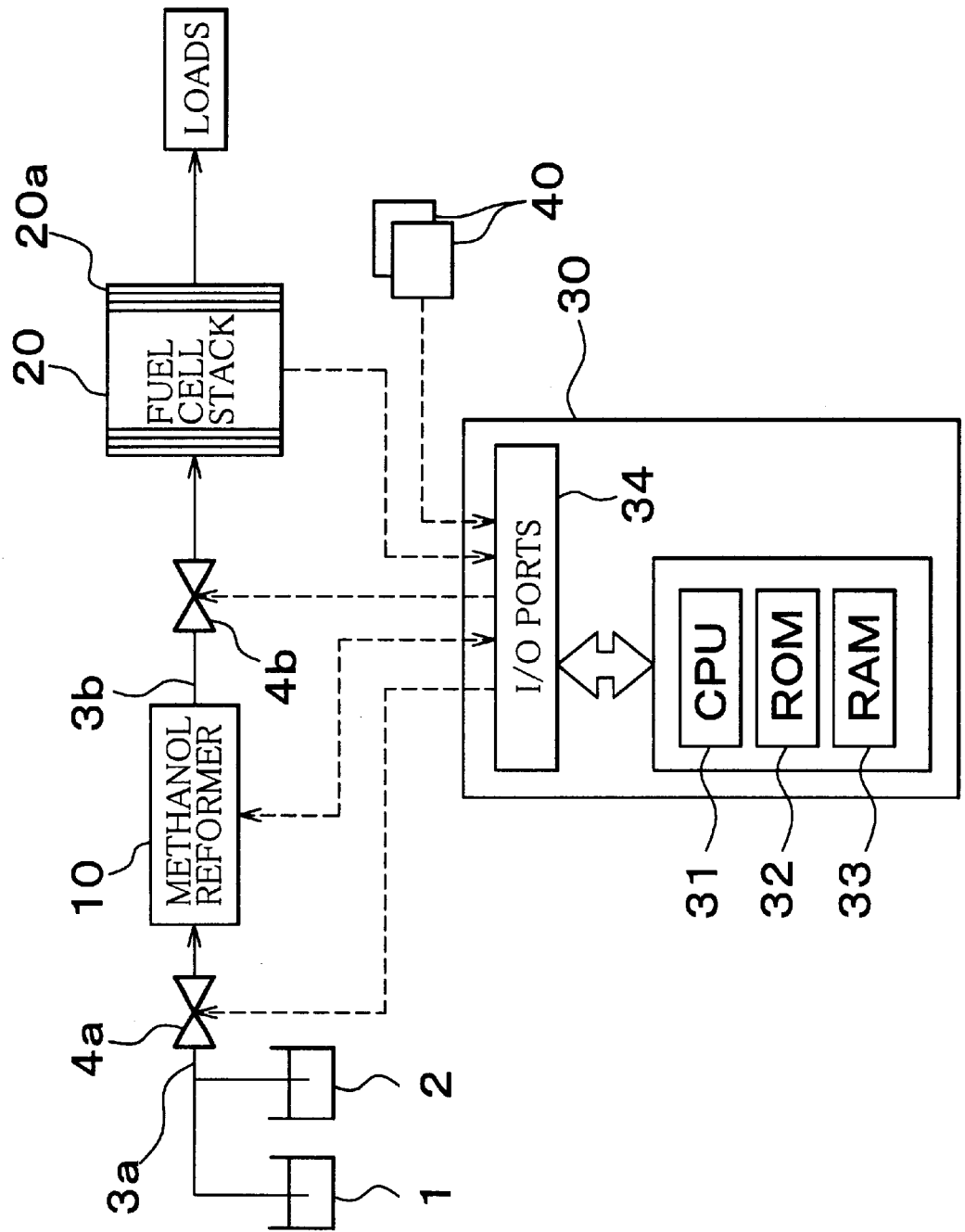
FIG. 1 is a block diagram schematically illustrating a construction of a first embodiment of the hydrogen using system for installation in a vehicle of the invention.

FIG. 1 is a block diagram schematically illustrating a construction of a hydrogen using system for installation in a vehicle according to this embodiment.

As shown in FIG. 1, this hydrogen using system has a methanol tank 1 that stores methanol as a source material for producing hydrogen, which is the fuel of the hydrogen using system, a water tank 2 that stores water, a methanol reformer 10 that produces hydrogen (fuel gas) from methanol and water, a polymer electrolyte fuel cell stack (hereinafter, simply referred to as "fuel cell stack") 20 that generates power upon supply of hydrogen fuel from the methanol reformer 10, and an electronic control unit 30 that controls various portions of the hydrogen using system, etc.

The methanol tank 1 and the water tank 2 are connected to the methanol reformer 10 via a channel (passage) 3$a$, through which methanol (source material) and water are conveyed to the methanol reformer 10. The methanol reformer 10 is connected to the fuel cell stack 20 via a channel (passage) 3$b$, through which the hydrogen fuel is conveyed to the fuel cell stack 20.

The methanol reformer 10, when supplied with methanol from the methanol tank 1 and water from the water tank 2, causes a "steam reforming reaction" as in the following equation (1) in the presence of a reaction accelerating catalyst, for example, a copper-type catalyst.

$$CH_3OH + H_2O \rightarrow 3H_2 + CO_2 \ -49.5 \text{ kJ/mol} \tag{1}$$

Thus, the methanol reformer 10 produces 3 mol of hydrogen from 1 mol of methanol. The methanol reformer 10 is also provided with a CO-selective oxidation reactor (not shown) for reducing the concentration of CO (carbon monoxide) produced as a byproduct of the aforementioned reaction, etc. The quantities of methanol and water supplied to the methanol reformer 10, and thus the quantity of hydrogen fuel produced, is controlled by the electronic control unit 30.

Figure 2:
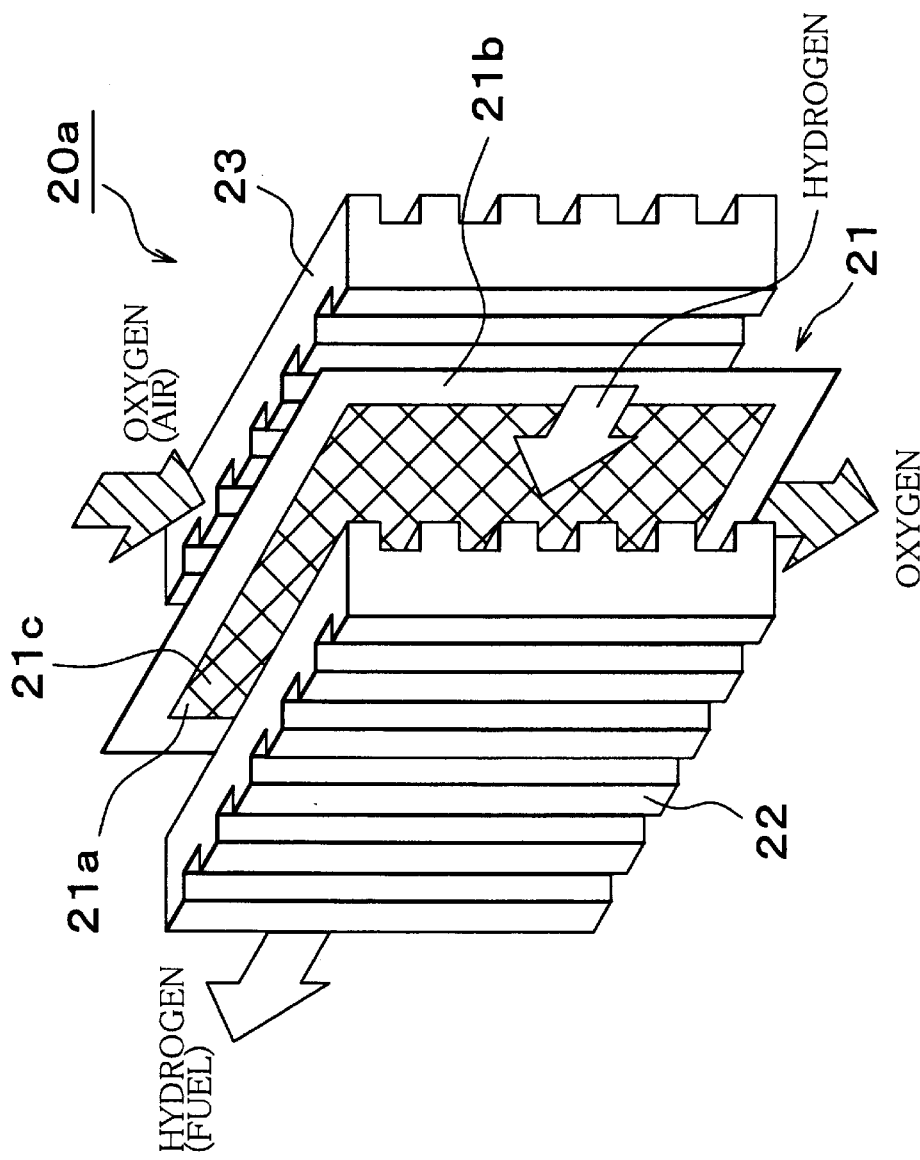
FIG. 2 is a perspective view illustrating a construction of a unit fuel cell employed in the embodiment.

The fuel cell stack 20 is formed by stacking unit cells 20$a$ as shown in FIG. 2 in series. Each unit cell 20$a$ has a structure in which a joined electrode body 21 is sandwiched between a pair of separators 22, 23 as shown in FIG. 2. Each joined electrode body 21 is formed by press-sandwiching an electrolyte membrane (solid polymer membrane) between a pair of electrically conductive porous electrodes (a hydrogen electrode 21$a$ and an oxygen electrode 21$c$) carrying thereon catalyst layers of platinum or the like. Each unit cell 20 generates power upon supply of hydrogen to the hydrogen electrode 21$a$ and supply of oxygen (air) to the oxygen electrode 21$c$. Electric power thus generated is supplied to loads, such as motors.

The electronic control unit 30 has a CPU 31 that executes predetermined operations or the like in accordance with pre-set control programs, a ROM 32 carrying pre-stored control programs, control data and the like needed for the CPU 31 to execute various operations, a RAM 33 to temporarily write data needed for the CPU 31 to execute various operations into, and read such data from, input/output ports 32 for outputting drive signals to various portions of the hydrogen using system and inputting signals from those portions, etc.

In addition to the above-described basic construction as a hydrogen using system, the system of the embodiment further has a passage shutter for, when an impact occurs on an vehicle, for example at the time of a crash or the like, shutting the channels 3a, 3b in accordance with the impact on the vehicle.

In this embodiment, the passage shutter is formed by an impact sensor 40, electromagnetic valves 4a, 4b, and the electronic control unit 30.

The impact sensor 40 is a sensor for detecting a crash of the vehicle or the like. In this embodiment, two impact sensors 40 are provided, one at each side of a forward portion of an engine compartment of the vehicle (not shown). The impact sensors 40 may also function as airbag censors (front airbag sensors) for activating an air bag (not shown). By sensing accelerations that occur at the time of a crash of the vehicle or the like, the sensors detect a crash of the vehicle. Thus, in this embodiment, an impact that occurs at the time of a crash of the vehicle is detected based on detection signals from the two impact sensors 40, which also serve as front airbag sensors.

The electromagnetic valve 4a is provided for the channel (passage) 3a as indicated in FIG. 1. The electromagnetic valve 4a is opened and closed by the electronic control unit 30 driving and controlling the solenoid of the electromagnetic valve 4a. The electromagnetic valve 4b is provided for the channel (passage) 3b, and is also opened and closed through control by the electronic control unit 30. The electromagnetic valves 4a, 4b are opened when their solenoids are not energized. The valves are closed when the solenoids are energized.

Next, a control sequence of shutting the channels (passages) 3a, 3b by forcibly closing the electromagnetic valves 4a, 4b in the above-described hydrogen using system for a vehicle when an impact occurs on the vehicle at the time of a crash or the like will be described with reference to a control routine illustrated in FIG. 3. This routine is executed by the CPU 31 (electronic control unit 30) at every predetermined length of time.

Figure 3:
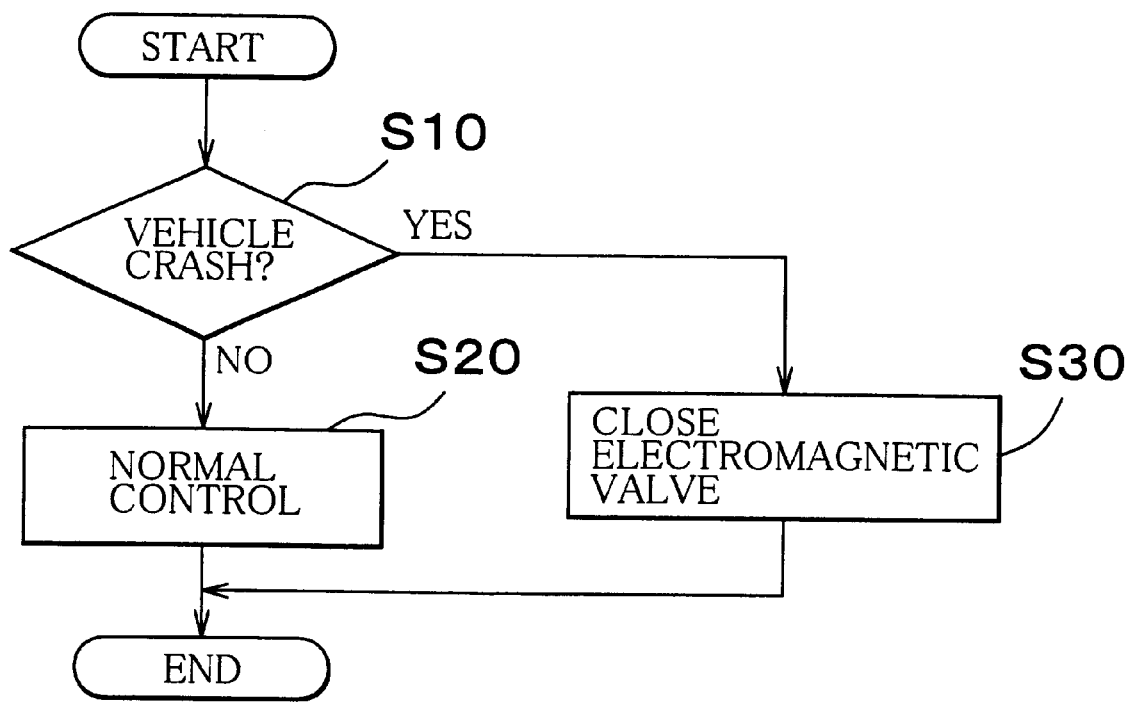
FIG. 3 is a flowchart illustrating a procedure of electromagnetic valve forcible closure control in the first embodiment.

In the control routine illustrated in FIG. 3, the CPU 31, in step S10, reads signals from the impact sensors 40 and determines whether a crash of the vehicle or the like has occurred. When the CPU 31 determines that no crash or the like has occurred based on the signals from the impact sensors 40, the CPU 31 proceeds to step S20, in which the CPU 31 executes a normal hydrogen fuel supply control and a normal power generation control. Then, the CPU 31 temporarily ends this routine.

Conversely, if it is determined in step S10 that a crash or the like has occurred to the vehicle, the CPU 31 proceeds to step S30, in which the CPU 31 simultaneously sends the electromagnetic valves 4a, 4b signals for forcibly closing the valves, thereby closing the electromagnetic valves 4a, 4b.

When the electromagnetic valves 4a, 4b are closed in this manner, the channel (passage) 3a for conveying methanol from the methanol tank 1 to the methanol reformer 10 and the channel (passage) 3b for conveying hydrogen fuel from the methanol reformer 10 to the fuel cell stack 20 are both shut. Therefore, the supply of methanol from the methanol tank 1 to the methanol reformer 10 is discontinued and, due to the discontinuation of the supply of methanol, the reforming production of hydrogen in the methanol reformer 10 is also discontinued. The supply of hydrogen fuel from the methanol reformer 10 to the fuel cell stack 20 is discontinued and, due to the discontinuation of the supply of hydrogen fuel, the power generation of the fuel cell stack 20 also terminates. As a result, the amount of hydrogen leaking from the hydrogen using system caused by a crash of the vehicle or the like can be minimized, and reactions of hydrogen leaking due to a crash of the vehicle or the like can be prevented.

As described above, the hydrogen using system for installation in a vehicle of this embodiment achieves the following advantages.

First, when a crash of the vehicle or the like occurs, the electromagnetic valves 4a, 4b are forcibly closed to shut the passage 3a for conveying methanol from the methanol tank 1 to the methanol reformer 10 and the passage 3b for conveying hydrogen from the methanol reformer 10 to the fuel cell stack 20. Therefore, the amount of hydrogen leakage can be minimized. As a result, reactions caused by hydrogen leakage or the like can also be prevented.

Furthermore, since the passage 3a and the passage 3b are shut down, the leakage of the hydrogen-producing source material and the leakage of hydrogen produced by reforming the material can both be reduced.

Furthermore since the airbag sensors, that is, the acceleration sensors used by an airbag system of the vehicle, are utilized as the impact sensors 40 for detecting impacts on the vehicle or the like, there is no need to add new sensors, thereby achieving an economic advantage.

The above-described first embodiment of the invention may be reduced to practice with modifications in construction as described below.

Although in the first embodiment, the electromagnetic valves 4a, 4b are both closed, the invention is not restricted by this construction. For example, it is possible to close only the electromagnetic valve 4a. In this case, the reforming production of hydrogen can be discontinued.

Although the above-described hydrogen using system of the first embodiment uses methanol as a source material for producing hydrogen and uses a methanol reformer as a reformer for producing hydrogen from the source material, the hydrogen using system may also use as a source material a hydrocarbon-type fuel such as natural gas or the like, and adopt a reformer that is designed for such a source material. In this case, too, advantages substantially the same as those of the first embodiment can be achieved if valves are provided in conveyance passages for conveying hydrogen and the hydrocarbon-type source material, such as natural gas or the like, and the valves are closed when a crash of the vehicle or the like occurs.

Figure 4:
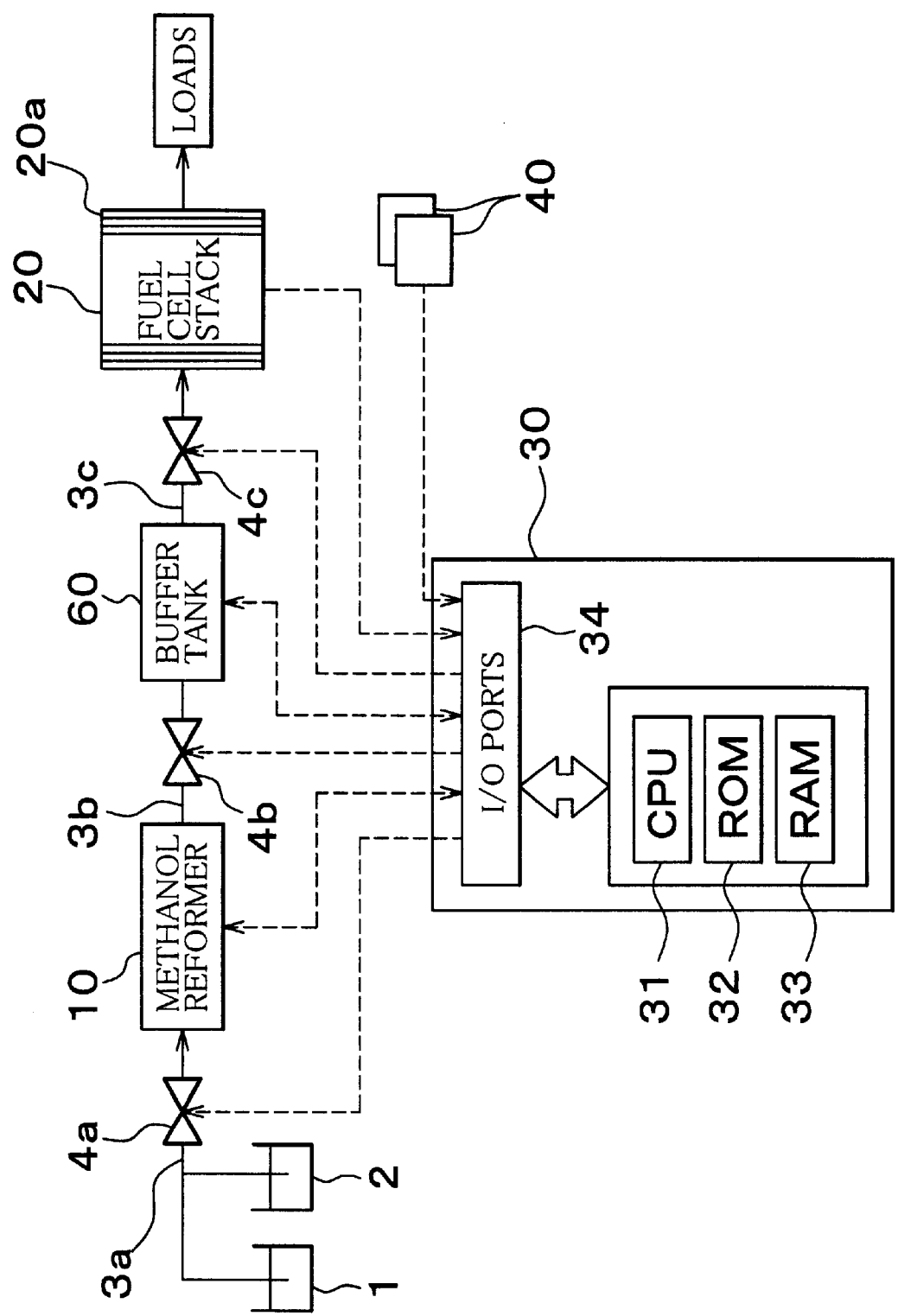
FIG. 4 is a block diagram schematically illustrating a construction of another embodiment of the hydrogen using system for installation in a vehicle of the invention.

Furthermore, the invention is also applicable to a hydrogen using system as shown in FIG. 4 wherein a hydrogen fuel buffer tank 60 is provided in a mid-portion of the passage extending from the methanol reformer 10 to the fuel cell stack 20. In this case, hydrogen leakage from the buffer tank 60 can be suitably curbed since an electromagnetic valve 4b as described above is provided in a channel (passage) 3b between the methanol reformer 10 and the buffer tank 60 as shown in FIG. 4, and an electromagnetic valve 4c that is also closed by the electronic control unit 30 is provided in a channel (passage) 3c between the buffer tank 60 and the fuel cell stack 20.

Figure 5:
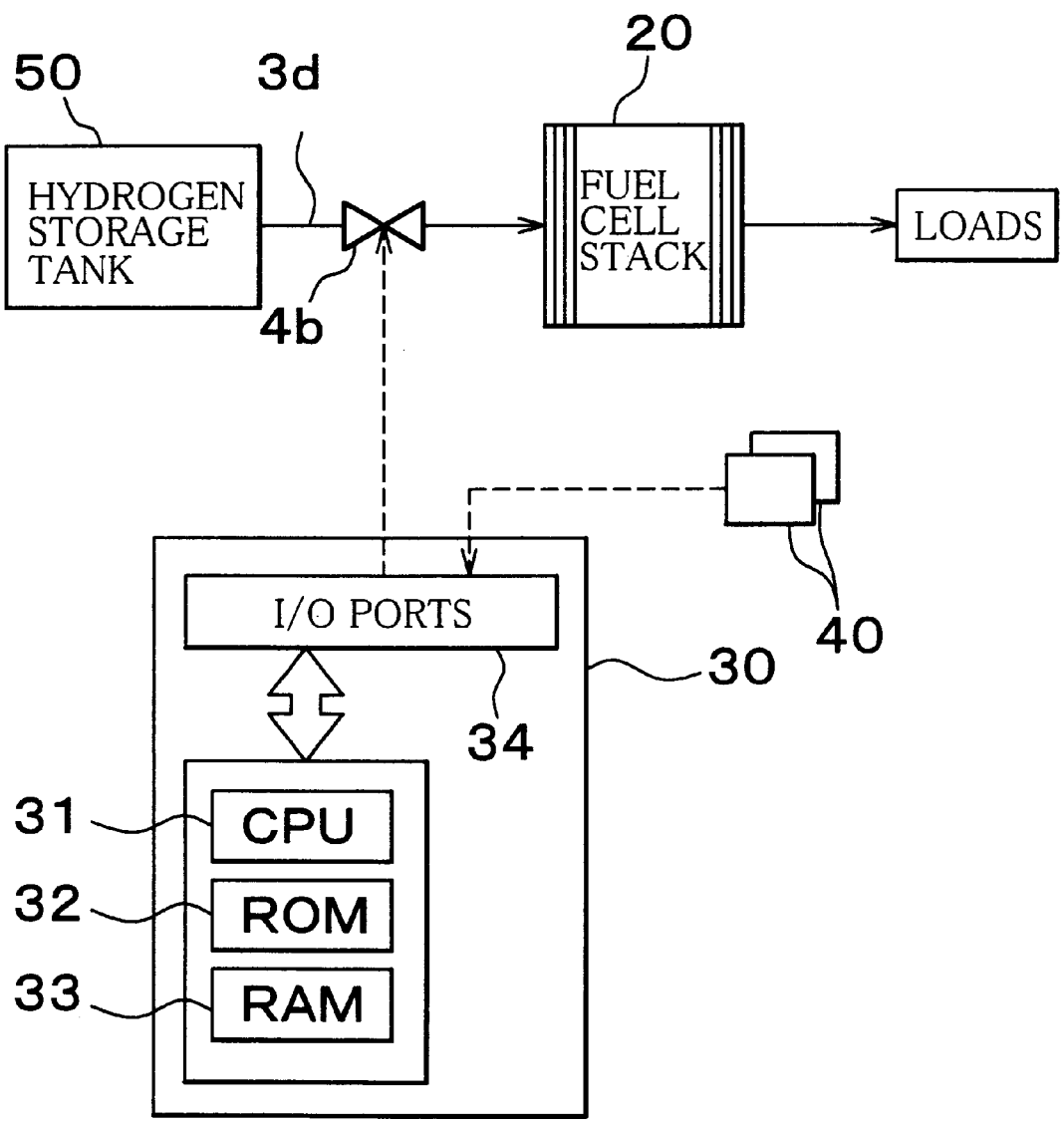
FIG. 5 is a block diagram schematically illustrating a construction of still another embodiment of the hydrogen using system for installation in a vehicle of the invention.

Although the above-described hydrogen using system of the first embodiment is a system wherein hydrogen fuel is not directly stored but the source material (methanol) tank 1 and the methanol reformer 10 are provided to produce hydrogen fuel, the hydrogen using system shown in FIG. 5 does not have a source material tank, a reformer or the like, but stores hydrogen fuel directly in a hydrogen storage tank 50 or the like. The invention is also applicable to such a system, in a manner substantially the same as described above. That is, in this case, hydrogen leakage from the hydrogen storage tank 50 can be suitably reduced since an electromagnetic valve 4b that is closed by the electronic control unit 30 as described above is provided for a channel (passage) 3d for conveying hydrogen fuel from the hydrogen storage tank 50 to the fuel cell stack 20.

Next, another embodiment of the hydrogen using system for installation in a vehicle of the invention will be described with reference to FIG. 6, mainly with respect to differences thereof from the first embodiment.

Figure 6:
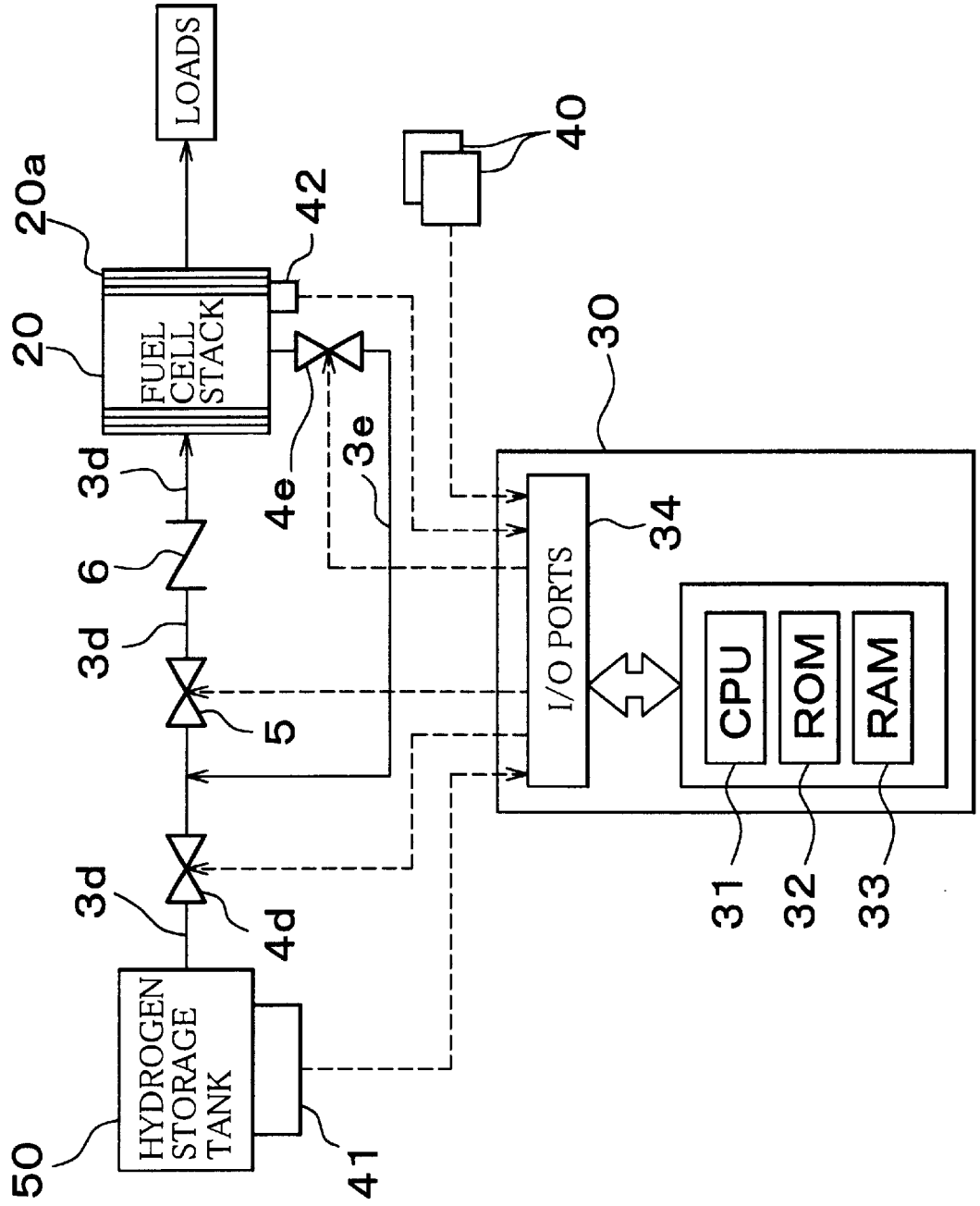
FIG. 6 is a block diagram schematically illustrating a construction of yet another embodiment of the hydrogen using system for installation in a vehicle of the invention.

As shown in FIG. 6, a hydrogen using system to which this embodiment is applied does not have a tank 1 that stores a source material for producing hydrogen fuel, a material reformer 10 or the like, but has a hydrogen storage tank 50 that stores hydrogen fuel.

In addition to the hydrogen storage tank 50 storing hydrogen as a fuel of the hydrogen using system, the system has a channel (passage) 3d that connects the tank 50 to a fuel cell stack 20 and that conveys hydrogen fuel to the fuel cell stack 20, a circulation channel 3e that connects the fuel cell stack 20 to the channel 3d and that conveys, in a circulating manner, any hydrogen that is not consumed by the fuel cell stack 20 back to the channel 3d for reuse, and an electronic control unit 30 that controls various portions of the hydrogen using system, etc.

Provided midway in the channel 3d are a pressure regulator valve 5 for regulating the pressure of hydrogen fuel flowing through the channel 3d and, downstream thereof, a check valve 6 for preventing reverse flow of hydrogen fuel. The opening and closing of the pressure regulator valve 5 is controlled by the electronic control unit 30.

In addition to the basic construction of the hydrogen using system, the hydrogen using system of this embodiment has a passage shutter for, when an impact occurs on an vehicle, for example at the time of a crash or the like, shutting the channels 3d, 3e in accordance with the impact on the vehicle.

The passage shutter is formed by impact sensors 40, 41, 42, electromagnetic valves 4d, is 4e, and the electronic control unit 30.

That is, in this embodiment, the sensors for detecting an impact that occurs on the vehicle at the time of a crash or the like include the impact sensor (airbag sensors) 40 and, furthermore, an impact sensor 41 provided on the hydrogen storage tank 50, and the impact sensor 42 provided on the fuel cell stack 20. As is the case with the impact sensor 40, the impact sensors 41, 42 are acceleration sensors that detect an impact on the vehicle or the like by sensing accelerations caused by the impact.

As shown in FIG. 6, the electromagnetic valve 4d is provided in a portion of the channel (passage) 3d upstream of the pressure regulator valve 5. The electromagnetic valve 4d is opened and closed by the electronic control unit 30 (CPU 31) driving and controlling the solenoid thereof. The electromagnetic valve 4e is provided in the circulation channel (passage) 3e, and is opened and closed through control by the electronic control unit 30.

The electromagnetic valves 4d, 4e are opened when their solenoids are not energized, and are closed when their solenoids are energized. The circulation channel 3e is connected to the channel 3d at a point between the electromagnetic valve 4d and the pressure regulator valve 5. So any hydrogen that is not consumed by the fuel cell stack 20 is returned to a portion of the channel 3d located downstream of the electromagnetic valve 4d and upstream of the pressure regulator valve 5.

When a crash of the vehicle or the like occurs and the CPU 31 of the thus-constructed hydrogen using system of this embodiment recognizes the impact based on the detection signal from at least one of the three impact sensors 40, 41, 42, the CPU 31 forcibly closes the electromagnetic valves 4d, 4e simultaneously using a control routine similar to the routine illustrated in FIG. 3.

When the electromagnetic valves 4d, 4e are closed, the channel 3d and the circulation channel 3e are both shut, and the conveyance of hydrogen fuel from the hydrogen storage tank 50 to the fuel cell stack 20 is stopped. Therefore, the conveyance of hydrogen from the fuel cell stack 20 to the channel 3d via the circulation channel 3e is also stopped. That is, even in the hydrogen using system having the channel 3e for recirculating any hydrogen that is not consumed by the fuel cell stack 20, hydrogen leakage from the fuel cell stack 20 as well as hydrogen leakage from the hydrogen storage tank 50 can be suitably reduced by closing the circulation channel 3e as well.

Furthermore, since the impact sensors 41, 42 are provided on the hydrogen storage tank 50 and the fuel cell stack 20 in this embodiment, the impacts occurring on the hydrogen storage tank 50 and the fuel cell stack 20 can be directly detected Therefore, the reliability of the system in reducing hydrogen leakage further improves.

As described above, the hydrogen using system for installation in a vehicle of this embodiment achieves the following advantages.

First, if a crash of the vehicle or the like occurs, the vehicular hydrogen using system having the hydrogen storage tank 50 and the passage 3e for recirculating any hydrogen that is not consumed by the fuel cell stack 20 shuts both the passage 3d for conveying hydrogen fuel from the hydrogen storage tank 50 to the fuel cell stack 20 and the passage 3e for recirculating hydrogen from the fuel cell stack 20 to the passage 3d, by forcibly closing the electromagnetic valves 4d, 4e. Therefore, the amount of hydrogen leakage can be minimized. As a result, reactions caused by hydrogen leakage or the like can be prevented.

Furthermore, in this embodiment, the impact that occurs at the time of a crash of the vehicle or the like is detected based on the detection by at least one of the impact sensor 40 (airbag sensor), the impact sensor 41 provided on the hydrogen storage tank 50, and the impact sensor 42 provided on the fuel cell stack 20. Therefore, the impacts occurring on the hydrogen storage tank 50 and the fuel cell stack 20 can be directly detected. Therefore, the reliability of the system in reducing hydrogen leakage further improves.

This embodiment of the invention may be reduced into practice with modifications in construction is described below.

Although in the present embodiment, the invention is applied to the hydrogen using system having the hydrogen storage tank 50 as a hydrogen storage tank, the invention may also be similarly applied to systems having other types of hydrogen storage tanks, such as a high-pressure hydrogen gas tank, a liquid hydrogen tank, and the like.

Although in this embodiment, the electromagnetic valves 4d, 4e are forcibly closed based on detection of an impact, the pressure regulator valve 5 may also be forcibly closed at the time of detecting an impact.

Examples of other elements of the foregoing embodiments that may be modified are cited below.

Although in the foregoing embodiments, the two front airbag sensors provided at both sides of a forward portion of the engine compartment of the vehicle are also used as the impact sensors 40, the invention is not restricted by this construction. For example, the airbag sensors that also serve as impact sensors 40 may instead be side airbag sensors provided in side door portions of the vehicle. Furthermore, the airbag sensors do not need to be used as impact sensors 40. That is, it is also possible to separately provide a predetermined number of impact sensors 40 at predetermined locations in the vehicle.

In the foregoing embodiments, the electromagnetic valves (4a–4e) are opened when their solenoids are not energized, and the electromagnetic valves are closed when their solenoids are energized. However, the electromagnetic valves (4a–4e) may be closed when their solenoids are not energized, and the valves may be opened when their solenoids are energized.

Although the valves employed in the foregoing embodiments are the electromagnetic valves, the valves may also be valves that are opened and closed by, for example, stepping motors and the like. The valves may also be valves that are mechanically closed upon receiving an electrical closure trigger signal.

The way of providing the valves (the number of valves, locations thereof, etc.) is not limited to what are described in conjunction with the foregoing embodiments. That is, the invention is applicable to any hydrogen using system for installation in a vehicle having valves, regardless of the way of providing the valves, as long as a conveyance passage related to conveyance of hydrogen or a hydrogen producing material is shut in accordance with the impact occurring on the vehicle.

Although in the foregoing embodiments, the passage shutter is constructed by the impact sensors (40, 41, 42), the electromagnetic valves (4a–4e), the electronic control unit (30), etc., the above-described construction does not limit the construction of the passage shutter in the invention. For example, it is possible to adopt a mechanism that mechanically shuts a conveyance passage related to conveyance of hydrogen or a hydrogen-producing material using an impact that is greater than a predetermined level as a trigger.

Although in the foregoing embodiments, the invention is applied to the systems employing polymer electrolyte fuel cells, the type of fuel cells to which the invention is applied is arbitrary.

Although in the foregoing embodiments, the invention is applied to the vehicle-installable hydrogen using system having fuel cell portions that produce electromotive force using hydrogen as a fuel, the invention is also applicable to, for example, a vehicular hydrogen using system that has a hydrogen reactor using hydrogen as a fuel which is adopted in a hydrogen vehicle, in a similar manner.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. A hydrogen using system for installation in a vehicle, comprising:
   a fuel cell portion that provides an electromotive force using hydrogen as a fuel;
   a conveyance passage that conveys the hydrogen to be used by the fuel cell portion;
   a first shutter positioned to shut the conveyance passage, said first shutter being operative to shut the conveyance passage upon detection of an impact on the vehicle, wherein the first shutter includes a first valve positioned to open and close the conveyance passage;
   a vehicle impact sensor; and
   a controller adapted to forcibly close the first valve based on detection of the impact by the impact sensor.

2. A hydrogen using system for installation in a vehicle according to claim 1, further comprising:
   a first passage that conveys the source material for producing the hydrogen;
   a second shutter positioned to shut the first passage, said second shutter being operative to shut the first passage in accordance with an impact on the vehicle.

3. A hydrogen using system for installation in a vehicle according to claim 2, wherein the first shutter includes a first valve positioned to open and close the conveyance passage, the second shutter includes a second valve positioned to open and close the first passage, further comprising
   a vehicle impact sensor; and
   a controller connected to forcibly close at least one of the first valve and the second valve based on detection of the impact by the impact sensor.

4. A hydrogen using system for installation in a vehicle according to claim 3, wherein the impact sensor is comprised by an acceleration sensor of an airbag system of the vehicle.

5. A hydrogen using system for installation in a vehicle according to claim 3, wherein the first valve and the second valve are an electromagnetic valve.

6. A hydrogen using system for installation in a vehicle according to claim 2, wherein methanol is used as the source material for producing the hydrogen.

7. A hydrogen using system for installation in a vehicle according to claim 2, wherein a hydrocarbon-type fuel is used as the source material for producing the hydrogen.

8. A hydrogen using system for installation in a vehicle according to claim 2, further comprising:
   a tank that stores a source material for producing the hydrogen; and
   a reformer that produces the hydrogen by reforming the source material,
   wherein the conveyance passage conveys the hydrogen produced by the reformer to the fuel cell portion, and
   wherein the first passage conveys the source material from the tank to the reformer.

9. A hydrogen using system for installation in a vehicle according to claim 8, wherein the first shutter includes a first valve positioned to open and close the conveyance passage, the second shutter includes a second valve positioned to open and close the first passage, further comprising:
   a vehicle impact sensor; and
   a controller connected to forcibly close at least one of the first valve and the second valve based on detection of the impact by the impact sensor.

10. A hydrogen using system for installation in a vehicle according to claim 9, wherein the vehicle impact sensor is provided in the fuel cell portion and in the tank.

11. A hydrogen using system for installation in a vehicle according to claim 2, further comprising:
    a first tank that stores the source material for producing the hydrogen;
    a reformer that produces the hydrogen by reforming the source material;

a second tank that stores the hydrogen produced by the reformer, wherein a first passage conveys the source material from the first tank to the reformer, and, wherein the conveyance passage includes:
- a second passage that conveys the hydrogen produced by the reformer to the second tank; and
- a third passage that conveys the hydrogen from the second tank to the fuel cell portion, and wherein the first shutter is provided in at least one of the second passage and the third passage.

12. A hydrogen using system for installation in a vehicle according to claim 11, wherein the first shutter includes:
- a first valve positioned to open and close the second passage; and
- a second valve positioned to open and close the third passage, the second shutter includes a third valve positioned to open and close the first passage, further comprising:
  - a vehicle impact sensor; and
  - a controller connected to forcibly close at least one of the first valve, the second valve and the third valve based on detection of the impact by the impact sensor.

13. A hydrogen using system for installation in a vehicle according to claim 12, wherein the impact sensor is provided in the fuel cell portion, the first tank, and the second tank.

14. A hydrogen using system for installation in a vehicle according to claim 1, further comprising a tank that stores the hydrogen,
wherein the conveyance passage conveys the hydrogen from the tank to the fuel cell portion.

15. A hydrogen using system for installation in a vehicle according to claim 14, wherein the impact sensor is provided in the fuel cell portion and the tank.

16. A hydrogen using system for installation in a vehicle according to claim 1, further comprising a tank that stores the hydrogen,
wherein the conveyance passage includes:
- a first passage that conveys the hydrogen from the tank to the fuel cell portion; and
- a second passage that recirculates hydrogen that is not consumed in the fuel cell portion to the first passage, wherein the first shutter is provided in at least one of the first passage and the second passage.

17. A hydrogen using system for installation in a vehicle according to claim 16, wherein the impact sensor is provided in the fuel cell portion and the tank.

18. A hydrogen using system for installation in a vehicle according to claim 16, further comprising:
- a pressure regulator valve positioned to regulate the pressure in the first passage so that an amount of the hydrogen corresponding to an amount of the hydrogen consumed in the fuel cell portion is supplied to the fuel cell portion; and
- a check valve positioned to substantially prevent a reverse flow of the pressure regulated hydrogen from the fuel cell portion, wherein the second passage has a first end side and a second end side, and wherein the second passage is connected via the first end side to the fuel cell portion, and is connected via the second end side to the first passage, so that the hydrogen is conveyed from the second passage to a portion of the first passage that is located upstream of the pressure regulator valve, and wherein the first valve provided in the first passage is located between the tank and a connecting portion between the first passage and the second passage.

19. The hydrogen using system of claim 1, further comprising a vehicle impact detector, and a controller operatively connected to said impact detector and to said first shutter.

20. A hydrogen using system for installation in a vehicle, comprising:
- a hydrogen reaction portion that uses a hydrogen as a fuel;
- a first passage that conveys the hydrogen to be used by the hydrogen reaction; and
- a first shutter positioned to shut the first passage upon detection of an impact on the vehicle, wherein the first shutter includes a first valve positioned to open and close the first passage;
- a vehicle impact sensor; and
- a controller adapted to forcibly close the first valve based on detection of the impact by the impact sensor.

21. A hydrogen using system for installation in a vehicle according to claim 20, further comprising:
- a second passage that conveys a source material for producing the hydrogen; and
- a second shutter positioned to shuts the second passage in accordance with an impact on the vehicle.

22. A hydrogen using system for installation in a vehicle according to claim 21, wherein the first shutter includes a first valve positioned to opens and closes the first passage, the second shutter includes a second valve positioned to open and close the second passage, further comprising:
- a vehicle impact sensor; and
- a controller connected to forcibly close at least one of the first valve and the second valve based on detection of the impact by the impact sensor.

23. The hydrogen using system of claim 20, further comprising a vehicle impact detector, and a controller operatively connected to said impact detector and to said first shutter.

24. A control method for a vehicle hydrogen using system including a fuel cell portion, comprising:
- detecting, using a vehicle impact sensor, whether an impact on the vehicle is present; and
- using a controller for shutting a valve in a passage that conveys a hydrogen to be used as a fuel by the fuel cell portion when the impact on the vehicle is detected.

25. A control method for a vehicle hydrogen using system including a fuel cell portion, comprising:
- detecting, using a vehicle impact sensor, whether an impact on the vehicle is present; and
- using a controller for shutting a valve in a passage that conveys a source material for a hydrogen to be used as a fuel by the fuel cell portion when the impact on the vehicle is detected.

26. A hydrogen using system for installation in a vehicle, comprising:
- a fuel cell portion that provides an electromotive force using hydrogen as a fuel;
- a conveyance passage that conveys the hydrogen to be used by the fuel cell portion; and
- shutter means for shutting the conveyance passage upon detection of an impact on the vehicle, wherein the shutter means includes a first valve positioned to open and close the conveyance passage;
- a vehicle impact sensor; and
- a controller adapted to forcibly close the first valve based on detection of the impact by the impact sensor.

* * * * *